United States Patent
Polinati et al.

(10) Patent No.: US 9,515,883 B2
(45) Date of Patent: Dec. 6, 2016

(54) AUTO DISCOVERY OF CONFIGURATION ITEMS

(71) Applicant: ServiceNow, Inc., Santa Clara, CA (US)

(72) Inventors: Chinna Polinati, Snoqualmie, WA (US); Jake Varghese, Seattle, WA (US); Sridhar Chandrashekar, Sammamish, WA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 14/976,780

(22) Filed: Dec. 21, 2015

(65) Prior Publication Data

US 2016/0182299 A1    Jun. 23, 2016

Related U.S. Application Data

(60) Provisional application No. 62/095,249, filed on Dec. 22, 2014.

(51) Int. Cl.
*H04L 12/24* (2006.01)
*H04L 29/08* (2006.01)

(52) U.S. Cl.
CPC ......... *H04L 41/0853* (2013.01); *H04L 41/083* (2013.01); *H04L 41/085* (2013.01); *H04L 41/12* (2013.01); *H04L 67/1061* (2013.01)

(58) Field of Classification Search
CPC ............... G06F 8/71; G06F 8/36; G06F 8/30; G06F 9/44505; G06F 17/30604; G06F 17/30395; G06F 17/30; G06F 17/30386; G06F 21/6218; G06F 8/10; G06F 11/0709; G06F 2209/544; H04L 41/0843; H04L 41/0866; H04L 41/0853; H04L 41/12; H04L 41/083; H04L 41/085; H04L 67/34; H04L 67/1061; H04L 67/1065
(Continued)

(56) References Cited

U.S. PATENT DOCUMENTS 6,286,047 B1 * 9/2001 Ramanathan ..... H04L 29/12066
                                                         370/229
8,024,320 B1 * 9/2011 Yehuda ............. G06F 17/30421
                                                         704/10
(Continued)

FOREIGN PATENT DOCUMENTS

GB        2489852 A      10/2012

OTHER PUBLICATIONS

Bieszczad, Andrzej et al., "Mobile Agents for Network Management", IEEE Communications Surveys, www.comsoc.org/pubs/surveys, Fourth Quarter 1998, vol. 1, No. 1, 8 pp.

*Primary Examiner* — Alina N Boutah
(74) *Attorney, Agent, or Firm* — Young Basile Hanlon & MacFarlane, P.C.

(57) ABSTRACT

Implementations of a system, method and apparatus described herein execute a discovery process to identify a plurality of computing devices within a computer network and a respective configuration associated with each of the plurality of computing devices. Upon discovery of a first computing device configured by an agent, configuration management of the computer network is searched for a definition used by the agent to configure the first computing device, and the discovery process for the first computing device is modified based on the definition to identify a first plurality of configuration items associated with a current configuration of the first computing device. Finally, a service model database is updated with the first plurality of configuration items.

20 Claims, 4 Drawing Sheets

(58) Field of Classification Search
USPC ......... 709/224, 223, 220, 221; 707/E17.005, 707/E17.014, 769, E17.044, 609, 802, 736, 707/E17.045, 706, 713, 999.2, E17.01, 707/E17.032, E17.048, E17.108; 717/121, 104, 717/120; 715/735; 713/1; 719/316

See application file for complete search history.

(56) References Cited

U.S. PATENT DOCUMENTS

| | | | |
|---|---|---|---|
| 8,612,574 B2* | 12/2013 | Akiyama | G06F 9/44505 709/224 |
| 2004/0261116 A1 | 12/2004 | Mckeown et al. | |
| 2007/0239700 A1* | 10/2007 | Ramachandran | H04L 41/0813 |
| 2008/0005186 A1* | 1/2008 | Ayachitula | G06Q 10/06 |
| 2008/0215713 A1* | 9/2008 | Cannon | H04L 12/24 709/221 |
| 2009/0013800 A1 | 1/2009 | Mehendale et al. | |
| 2009/0089072 A1* | 4/2009 | Gupta | G06F 17/30286 705/1.1 |
| 2009/0094695 A1 | 4/2009 | Bansal et al. | |
| 2009/0144319 A1* | 6/2009 | Panwar | G06F 17/30569 |
| 2009/0187595 A1* | 7/2009 | Akiyama | G06F 9/44505 |
| 2009/0187596 A1* | 7/2009 | Akiyama | G06F 9/44505 |
| 2009/0210435 A1* | 8/2009 | Akiyama | G06F 17/30292 |
| 2009/0216786 A1* | 8/2009 | Akiyama | G06F 8/34 |
| 2009/0249340 A1* | 10/2009 | Akiyama | G06Q 10/10 718/100 |
| 2009/0327630 A1* | 12/2009 | Akamatsu | G06F 11/1451 711/162 |
| 2010/0057780 A1* | 3/2010 | Isobe | G06F 8/71 707/E17.045 |
| 2010/0095273 A1* | 4/2010 | Matthiesen | G06F 8/71 717/120 |
| 2010/0106821 A1* | 4/2010 | Akiyama | G06F 17/30604 709/224 |
| 2010/0115520 A1* | 5/2010 | Kohno | G06F 9/4881 718/101 |
| 2011/0016368 A1 | 1/2011 | Ayachitula et al. | |
| 2011/0238658 A1* | 9/2011 | Schimmelpfeng | H04L 41/0853 707/723 |
| 2011/0246499 A1* | 10/2011 | Carmel | G06Q 10/06 707/769 |
| 2011/0321033 A1* | 12/2011 | Kelkar | G06F 9/44505 717/174 |
| 2012/0166485 A1* | 6/2012 | Tashiro | G06F 17/30525 707/783 |
| 2012/0210158 A1* | 8/2012 | Akiyama | G06F 21/554 714/2 |
| 2013/0159358 A1* | 6/2013 | Sasatani | B82Y 10/00 707/812 |
| 2013/0179537 A1* | 7/2013 | Dawson | H04L 41/0816 709/217 |
| 2014/0006432 A1* | 1/2014 | Miyagi | G06F 17/30283 707/758 |
| 2014/0019611 A1* | 1/2014 | Weavind | H04L 41/0853 709/224 |
| 2014/0025788 A1* | 1/2014 | Mahadevan | H04L 43/08 709/220 |
| 2014/0067804 A1* | 3/2014 | Yoshizawa | G06F 17/30595 707/736 |
| 2014/0280130 A1* | 9/2014 | Kumar | G06F 17/30303 707/736 |
| 2014/0280268 A1* | 9/2014 | McKay | G06F 17/30286 707/758 |
| 2014/0280306 A1 | 9/2014 | Juillard | |
| 2015/0120703 A1* | 4/2015 | Sityon | G06F 21/6227 707/722 |
| 2015/0120908 A1* | 4/2015 | Anderson | H04L 41/046 709/224 |
| 2015/0280981 A1* | 10/2015 | Sasada | H04L 67/32 709/222 |

* cited by examiner

AUTO DISCOVERY OF CONFIGURATION ITEMS

CROSS REFERENCE TO RELATED APPLICATIONS

The present application claims the benefit of U.S. Provisional Application No. 62/095,249, filed Dec. 22, 2014, entitled, "Auto Discovery of Configuration Items", herein incorporated by reference.

TECHNICAL FIELD

The present disclosure relates in general to techniques and devices for the automated discovery of configuration items, and in particular to discovery using both a service model definition and configuration management role information.

BACKGROUND

Cloud computing relates to the sharing of computing resources that are typically accessed via the Internet and is one example of the broader concept of distributed computing. Distributed computing infrastructure generally includes a large number of information technology assets, including servers, such as application servers, web servers, and/or database servers, that are configured to execute various programs. The servers may be used to implement a configuration management database (CMDB). A CMDB can include a number of Configuration Items (CI), each of which is a configuration related to an information technology asset.

SUMMARY

Distributed computing, such as cloud computing, provides scalable services to customers. Scalable services shrink and grow by removing or adding virtual or physical nodes dynamically, where nodes are represented by one or more CIs that are related to them. An automatic discovery process (also called auto-discovery) identifies configuration items within the nodes of the computing infrastructure. This can be a time-consuming process made more difficult by the dynamic nature of the changes, particularly for virtual nodes and hence virtual CIs. Therefore, the present disclosure provides an apparatus and a method for enhancing the speed of an automatic discovery process in a distributed computing infrastructure.

This disclosure describes a beneficial discovery process of CIs when a computing device, or host, is found that is configured by an agent. In one implementation of the teachings herein, an apparatus is provided for discovering nodes in a computer network of a distributed computing system, comprising a physical network interface that connects the apparatus to a computer network, and a processor configured to execute instructions stored in the memory, the processor comprising a discovery process module executed by the processor, comprising: an identification module that identifies a plurality of computing devices within the computer network by a signal input received at the physical network interface, the signals being related to the computing devices communicated over the computer network, and a configuration input module that inputs a respective configuration stored in a memory device, the configuration being associated with each of the plurality of computing devices, a discovery module that comprises: a configuration management search module, a discovery process modification module, a service model database update module, wherein the discovery module, upon discovery of a first computing device configured by an agent utilizes the configuration management search module to search configuration management data of the computer network for a definition used by the agent to previously configure the first computing device, utilizes the discovery process modification module to modify the discovery process for the first computing device based on the definition to identify a first plurality of configuration items associated with a current configuration of the first computing device, and utilizes the service model database update module to update a service model database with the first plurality of configuration items, wherein the updated service model database is utilized in a subsequent discovery process to enhance a speed of the discovery process in the network.

In another implementation of the teachings herein, a method is provided for discovering nodes in a computer network of a distributed computing system, comprising executing, using a processor, a discovery process to identify a plurality of computing devices within a computer network and a respective configuration associated with each of the plurality of computing devices, the discovery process comprising inputting, at a physical network interface, signals obtained from the network related to the computing devices communicated over the network, upon discovery of a first computing device configured by an agent searching, using the processor, configuration management data of the computer network that is stored in a physical memory for a definition used by the agent to configure the first computing device, modifying, using the processor, the discovery process for the first computing device based on the definition to identify a first plurality of configuration items associated with a current configuration of the first computing device, and updating, using the processor, a service model database with the first plurality of configuration items.

In another implementation of the teachings herein, an apparatus is provided for discovering nodes in a computer network of a distributed computing system, comprising a processor configured to execute instructions stored in a physical memory to execute a discovery process to identify a plurality of computing devices within a computer network and a respective configuration associated with each of the plurality of computing devices, upon discovery of a first computing device configured by an agent search configuration management data of the computer network that is stored in a memory for a definition used by the agent to configure the first computing device, and modify the discovery process for the first computing device based on the definition to identify a first plurality of configuration items associated with a current configuration of the first computing device, and update a service model database with the first plurality of configuration items.

Details of and variations in these implementations and aspects, and other implementations and aspects, are described hereinafter.

BRIEF DESCRIPTION OF THE DRAWINGS

The description herein makes reference to the accompanying drawings wherein like reference numerals refer to like parts throughout the several views.

DETAILED DESCRIPTION

Figure 1:
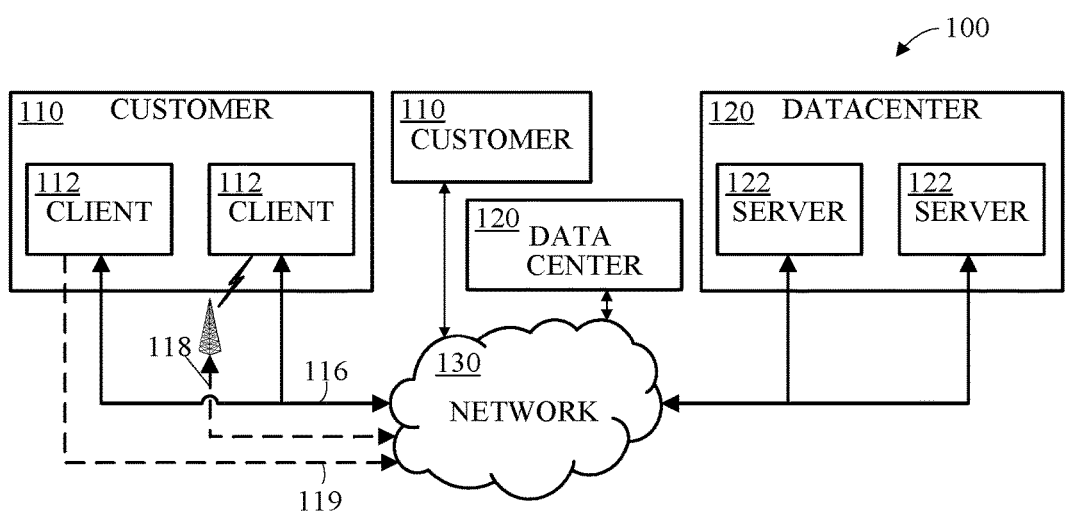
FIG. 1 is a block diagram of a networked distributed or cloud computing system in which the teachings herein may be implemented.

Distributed computing, such as cloud computing, can provide various advantages over traditional computing models, including the ability to allocate shared resources among many different customers. Under traditional computing models, computing resources are typically allocated to a single customer or entity and substantial portions of those resources may remain unused or underused. The description below references cloud computing as one example of distributed computing. This is by example only and is not intended to be limiting or restricting.

Computing resources of a cloud computing infrastructure may be allocated, for example, using a multi-tenant or single-tenant architecture. Under a multi-tenant architecture, installations or instantiations of application, database and/or other software application servers may be shared among multiple customers. For example, a single web server (e.g., a unitary Apache installation), application server (e.g., a unitary Java Virtual Machine) and/or a single database server catalog (e.g., a unitary MySQL catalog) may handle requests from multiple customers. In a multi-tenant architecture, data or applications used by various customers can be commingled or shared. In an implementation of this architecture, the application and/or database server software can distinguish between and segregate data and other information of the various customers using the system. For example, database records belonging to a particular customer may be identified using a customer identifier field in a database table holding records for numerous customers. The database table may be in the form of a configuration management database (CMDB).

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog(s). Physical hardware servers may be shared such that multiple installations or instantiations of web, application and/or database servers may be installed on the same physical server. Each installation may be allocated a certain portion of the physical server resources, such as RAM, storage, and CPU cycles.

In one implementing example, a customer instance is composed of multiple web server instances, application server instances, and database server instances. As previously described, each of these server instances may be located on different physical servers and each of these server instances may share resources of the different physical servers with a number of other server instances associated with other customer instances. The web, application and database servers of the customer instance can be allocated to two or more different datacenters to facilitate high availability of the applications and data provided by the servers. In a given infrastructure system, different implementations of customer instances may be used for different customer instances at the same time. Other configurations and implementations of customer instances may also be used.

The application servers can include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances can be configured with a database configuration and schema to facilitate the operation of the platform. For example, the database server instance can be configured with various tables for storing metadata about applications, tables/fields, menus, forms, business rules, scripts, and custom user interface (UI) elements that are used to customize the appearance and operation of the customer instance. In some implementations, the application servers can include web server functionality and the web servers can be omitted.

Configuration items (CIs) may be stored within a CMDB located within or connected to a computing infrastructure and represent the components within the computing infrastructure that are managed to deliver services to a customer. For example, CIs may represent databases, applications, operating systems, servers, and other types of computers, network components such as routers, firewalls and switches, communication devices such as telephones, storage devices, etc. CIs may also represent instances of such components, for example, a web server instance, an application server instance, or a database server instance. CIs may be related or overlap. For example, one CI may represent the customer instance described above. That customer instance CI is composed of multiple web server instances, application server instances, and database server instances, each of which also be represented by its own CI. As is clear from the foregoing description, CIs may represent physical components, such as data processing and/or communication equipment, or virtualized representations of physical components running on such equipment.

Distributed computing, such as cloud computing, provides scalable services to customers. Scalable services shrink and grow by removing or adding virtual or physical nodes dynamically, where nodes are represented by one or more CIs. An automatic discovery process (also called auto-discovery) identifies configuration items within the nodes of the computing infrastructure. This can be a time-consuming process made more difficult by the dynamic nature of the changes, particularly for virtual nodes and hence virtual CIs. As described in further detail below, the auto-discovery of CIs may be made more efficient by incorporating information from one or more service model definitions and the configuration management of the computing infrastructure when performing auto-discovery.

FIG. 1 is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients. Customers and clients may be described more generally as respective user entities/groups and end users.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the computing system 100 are also possible. For example, devices other than the clients and servers shown may be included in the computing system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
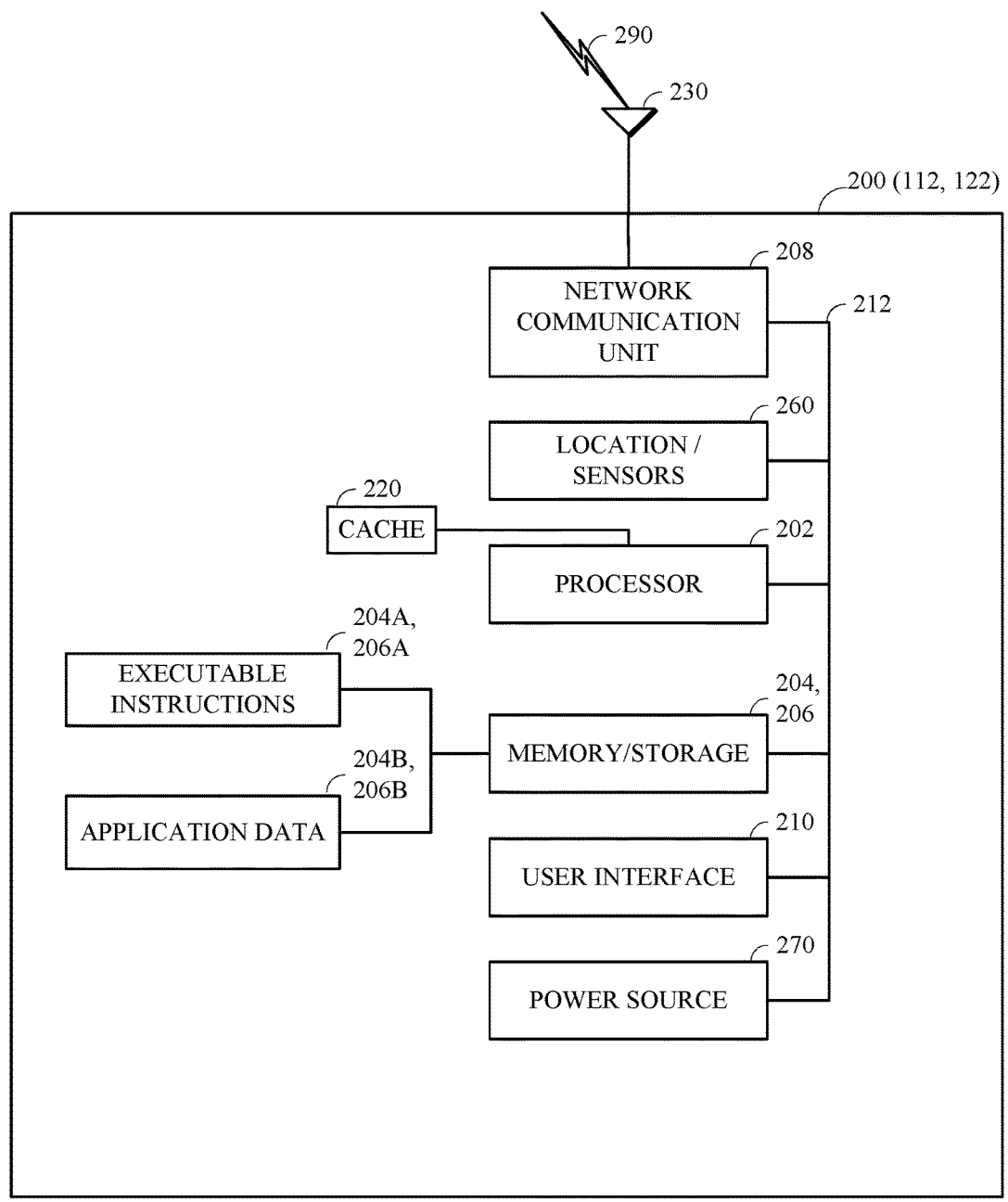
FIG. 2 is a block diagram of an example internal configuration of a computing device, such as a computing device of the computing system as shown in FIG. 1.

FIG. 2 is a block diagram of an example internal configuration of a computing device 200, such as a client 112 or server 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and physical network interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Output devices that permit a user to program or otherwise use the client or server can be provided in addition to or as an alternative to a display as the user interface 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers other than that shown by the computing device 200 are also possible. For example, servers may omit a display for the user interface 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. A computing device 200 may contain any number of sensors and detectors that monitor the computing device 200 itself or the environment around the computing device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
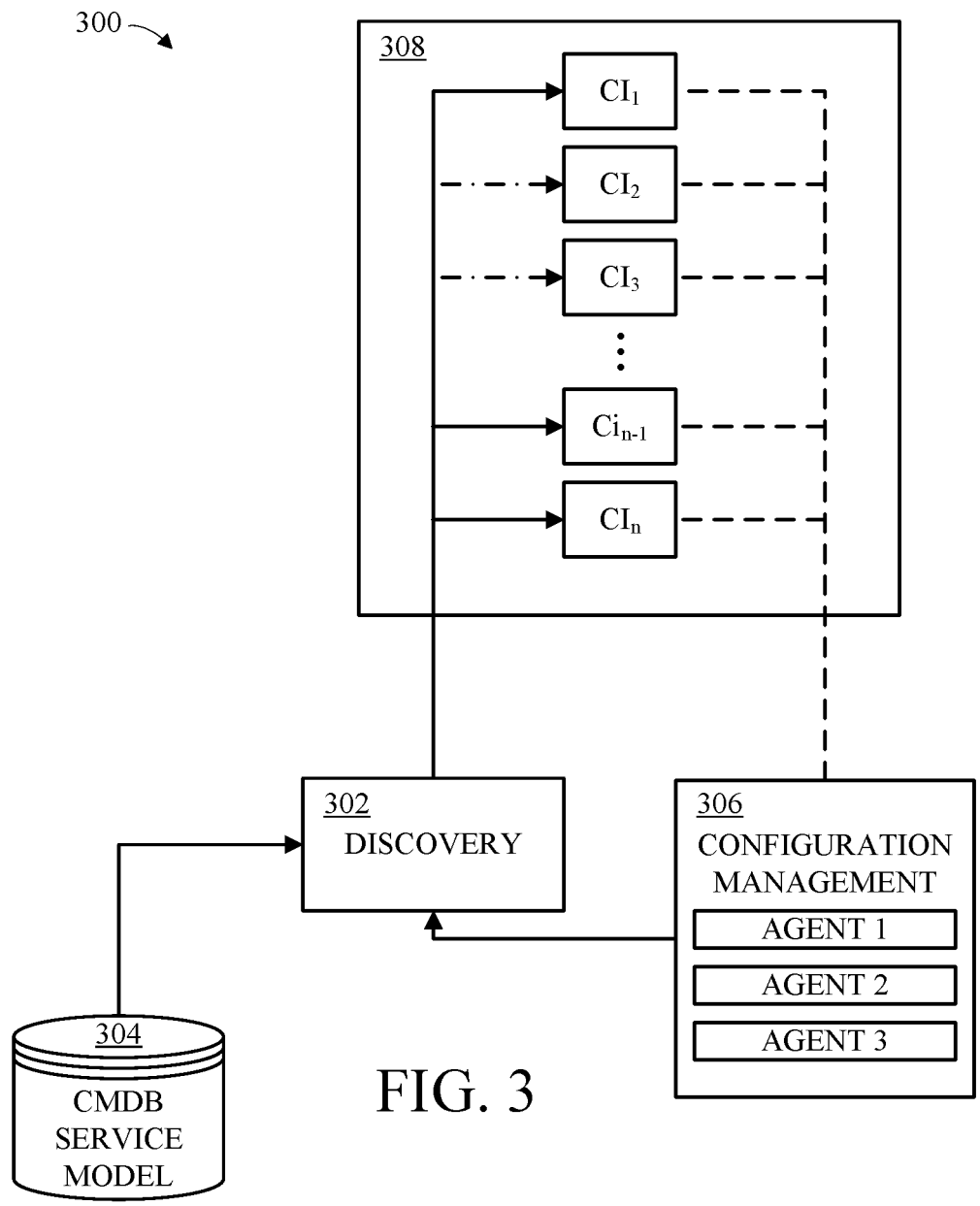
FIG. 3 is a block diagram of a logic flow among configuration items, a service model, configuration management, and a discovery process.

FIG. 3 is a block diagram of a logic flow among configuration items that demonstrates the logic flow of cloud computing system 100. As mentioned above with respect to FIG. 1, CIs (also called CI records) may be stored within a database (e.g., a CMDB). The CI records may be populated in the CMDB in a number of ways. As shown in FIG. 3, an automated discovery product 302 may be installed on a device on a network 130 to collect information regarding hardware on the network (e.g., laptops, desktops, servers, printers, etc.), software running on that hardware, and the relationship between the items, and report that information back to a CMDB service model 304. Importing the information from an external source may be done through an import of information in a standard file format such as XML or CSV, which is then transformed into appropriate tables and records in CMDB service model 304. The CI records may be imported into CMDB service model 304 by integrating CMDB service model 304 with other CMDBs. In certain implementations, CMDB service model 304 maintains a record of previous results of auto-discovery. Auto-discovery forms part of the cloud infrastructure control described above and is performed periodically and/or in response to a user- or system-initiated event. That is, automated discovery product 302 may be implemented within a datacenter, such as on one of servers 122 within datacenter 120, or on a separate cloud infrastructure control server. Automated discovery product 302 may also possibly be implemented within a customer device, such as on a client 112 of customer 110.

Services within cloud computing system 100 are often formed of multiple layers like the customer instance described above. In a further example, a service may be composed of a web tier, an application tier, a cache tier, and a storage tier that are grouped into individual clusters of multiple hosts/machines, also referred to as nodes. The tiers generally have defined roles within the service, and provide more flexibility in scaling operations and preserving resources.

A discovery system 300 with a cluster 308 is illustrated in FIG. 3. In FIG. 3, automated discovery product 302 performs a systematic discovery process to locate each of the configuration items CI that represent components (virtual or physical) within the computing infrastructure that are managed to deliver services to a customer. In this case, $CI_1$, $CI_2$, $CI_3$, ... $CI_{n-1}$, $CI_n$, are identified as belonging to a single cluster 308. $CI_1$ through $CI_n$ may represent different web server instances within a web tier for several clients of a customer or may represent a software program operating on different application servers for a client. These are examples only, and are not limiting. CMDB service model 304 may be considered as a collection of these roles/tiers, along with their relationships/dependencies. CMDB service model 304 may be viewed as the actual configuration of deployed services of cloud computing system 100.

Configuration management 306 of cloud computing system 100, like automated discovery product 302, may form part of the cloud infrastructure control. The hosts or nodes within a cluster often have similar definitions due to their common role. In some cases, this may be the result of the application of configuration definitions from tools within configuration management 306. In FIG. 3, these tools are represented by Agent 1, Agent 2 and Agent 3. For example, the configuration definition may include such information as operating system version, memory allocated to each customer instance within the host for the tier, etc. When a tool of configuration management 306 is used to configure a host, the resulting CIs are identified with the tool (such as Agent 1, 2 or 3) when discovered and are thus so identified within CMDB service model 304. Configuration management role information (e.g., the configuration definition) desirably remains unchanged over time for individual agents. In the event a different configuration definition is required or desired, a new agent may be added to configuration management 306. For this reason, configuration management role information may be viewed as the service model definition (e.g., the planned configuration) of cloud computing system 100.

Figure 4:
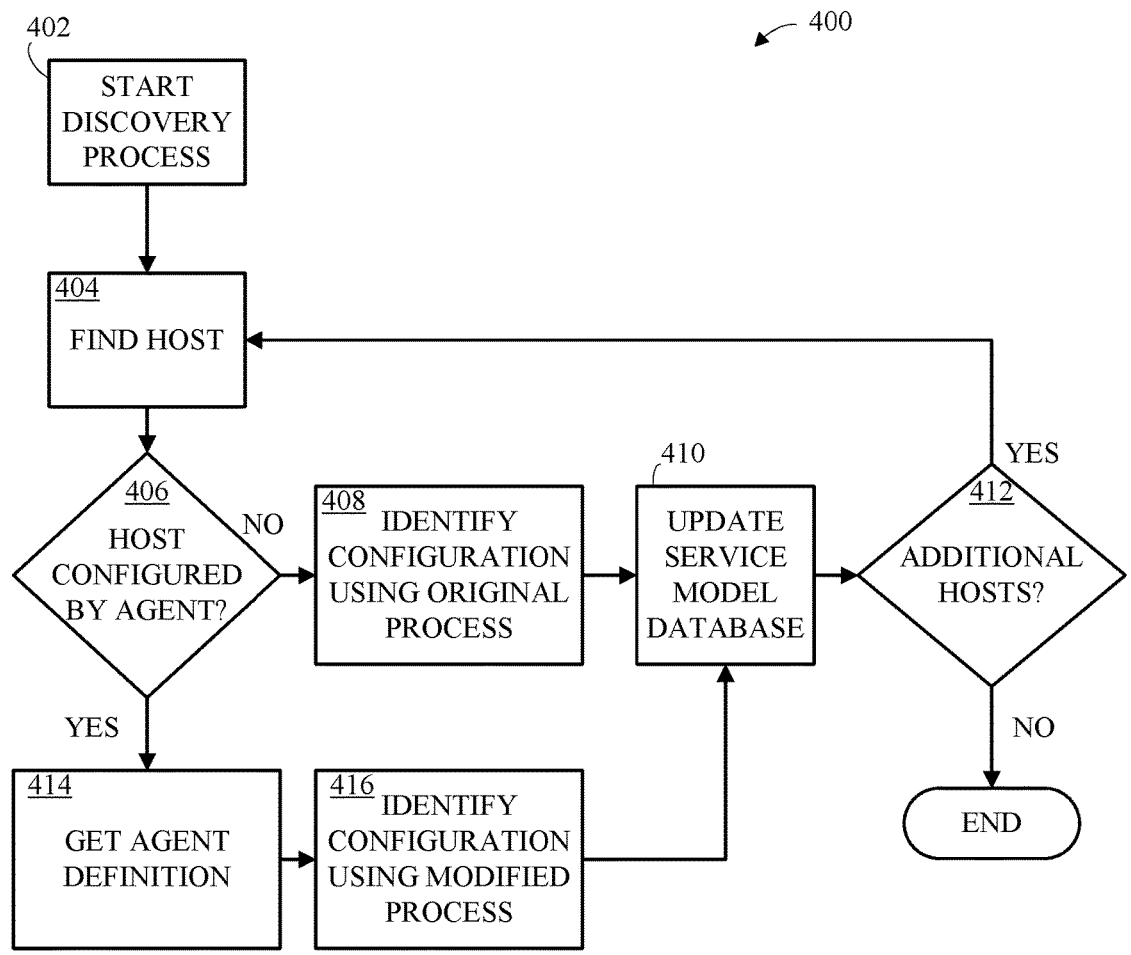
FIG. 4 is a flow chart illustrating a method according to the teachings herein.

The flow chart diagram of FIG. 4 illustrates a method 400 implementing a discovery process according to the teachings herein. Method 400 can be implemented in a system such as the client 112 or server 122. At least portions of method 400 can be implemented, for example, as a software program/application files/data 206B that are executed thereby. The software program can include machine-readable, executable instructions 206A that are stored in a memory such as storage 206 that, when executed by a processor such as CPU 202, cause a client 112 or server 122 to perform method 400. Method 400 can also be implemented using hardware in whole or in part. Some computing devices may have multiple memories and multiple processors, and the operations of method 400 may, in such cases, be distributed using different processors and memories. Use of the terms "processor" and "memory" in the singular herein encompasses computing devices that have only one processor or one memory as well as devices having multiple processors or memories that may each be used in the performance of some but not necessarily all recited operations.

For simplicity of explanation, method 400 is depicted and described as a series of operations. However, operations in accordance with this disclosure can occur in various sequential orders and/or concurrently. Additionally, operations in accordance with this disclosure may occur with other operations not presented and described herein. Furthermore, not all illustrated operations may be required to implement a method in accordance with the disclosed subject matter. Method 400 may be performed periodically, responsive to a user instruction and/or responsive to a change to hardware or software of cloud computing system 100, or some other form of predefined or dynamically created trigger.

Method 400 starts a discovery process at operation 402. The discovery process at operation 402 may be an exhaustive discovery process that seeks out each configuration item CI within the computing system 100. The discovery process may be performed by automated discovery product 302 described above, and it collects information about devices and/or services that form customer environments. For example, the discovery process at operation 402 may seek each hardware device interconnected to form cloud computing system 100, which may be represented by a respective CI, and identify the connections/relationships between those hardware devices to identify the relationships between the CIs. The discovery process at operation 402 can also identify installed software, operating systems, etc., each of which may also be represented by a respective CI, and associates these CIs with the CIs representing the hardware devices on which they are installed and/or operating.

In the implementation of FIG. 4, the discovery process builds its profile of cloud computing system 100 by proceeding host-to-host, where each host is a computing device 200 such as that shown by example in FIG. 2 (i.e., a computer, such as a client 112, server 122, or other computational device, that includes a processor). Accordingly, the next operation 404 of the method 400 finds a host. Then, a query is made at operation 406 to determine whether the host was configured by an agent such as Agent 1, Agent 2 or Agent 3 of configuration management 306. This can be done by checking a code identifying the agent that is stored in memory of the host or by checking a code stored with the CI representing the host within CMDB service model 304. Other ways of determining whether the host has been configured by an agent are possible.

If the host is not configured by an agent 406:N, method 400 advances to identify the configuration (and hence configuration items CI) associated with the host at operation 408. To perform the exhaustive process described above, virtual instances or hardware components within or attached to the host may be searched for using one or more lists of all possible virtual instances or hardware components. In some cases, this information may be obtained from the results of previous searches. In one example, the list(s) are based on data within CMDB service model 304. A service model database, such as CMDB service model 304, is updated at operation 410 after the identification of the configuration at operation 408.

Once analysis of the host is complete, method 400 advances to operation 412 to query whether there are additional hosts whose configuration has not been identified. If so 412:Y, method returns to operation 404 to find the next host. If there are no additional hosts 412:N, method 400 ends.

In contrast, if the host was configured by an agent 406:Y, method 400 proceeds from operation 406 to operation 414. At operation 414, method 400 gets the agent definition. For example, method 400 obtains the configuration management role information for the agent used to configure the host from configuration management 306. This configuration management role information can be used to modify the existing discovery process. Instead of performing an exhaustive search as in operation 408, method 400 advances to identify the configuration associated with the host at operation 416 by searching for the CIs that would have been established when the agent configured the host based on the configuration management role information. In this modified process, CIs that have not changed in their roles and interconnections are identified. CIs that are no longer present can also be identified. New CIs that may have been established after the agent configured the host are not identified in this modified process at operation 416. Method 400 then proceeds to operation 410 as described above to update the service model database. As mentioned above, method 400 ends when there are no additional hosts found.

Using the modified discovery process, performing discovery for software, etc., not expected to be on a machine can be avoided based on its definition. Periodically or on demand, a full discovery performance may be performed on agent-configured hosts to capture non-conforming CIs.

Scalability (i.e., removing/shrinking and adding/scaling-out nodes dynamically) is common in distributed computing systems due to the rapid changes in service usage. This is particularly complex in virtualized environments as nodes can come, go, or migrate at the will of an administrator. Discovery can be difficult because the composition of services (in the case of clusters) and the definition of a CI (in the case of virtualized environments) may be quite different from the last time the service and/or CI was discovered.

By tightly integrating configuration management role information, from configuration management 306 for example, with the service model, such as CMDB service model 304, hints may be provided to the discovery process that allows accurate discovery of clusters, migrated nodes, added/removed nodes/hosts from clusters, etc. Integrating the discovery process with a past service model and its definition allows both the accurate discovery of services and the ability to discover the drift of a deployed service from its original definition.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the invention may be implemented using machine readable instructions in the form of code for operation of any or any combination of the aforementioned computational hardware. Computational code may be implemented in the form of one or more modules by which individual or combined functions can be performed as a computational tool, the input and output data of each module being passed to/from one or more further module during operation of the methods and systems described herein.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A, X includes B, or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. An apparatus for discovering nodes in a computer network of a distributed computing system, comprising:
   a physical network interface that connects the apparatus to a computer network, and
   a processor configured to execute instructions stored in a memory, the instructions comprising:
      a discovery process module that comprises:
         an identification module that identifies a plurality of computing devices within the computer network by a signal input received at the physical network interface, the signals being related to the computing devices communicated over the computer network, and
         a configuration input module that inputs a respective configuration stored in a memory device, the respective configuration being associated with at least some of the plurality of computing devices,
      a discovery module that comprises:
         a configuration management search module, and
         a service model database update module,
      wherein the discovery module, upon discovery of a first computing device not configured by an agent:
         performs a first discovery process for the first computing device to identify configuration items associated with a current configuration of the first computing device, and
         utilizes the service model database update module to update a service module database with the identified configuration items,
      wherein the discovery module, upon discovery of a first computing device configured by an agent:
         utilizes the configuration management search module to search configuration management data of the computer network for a definition used by the agent to previously configure the first computing device,
         performs a second discovery process, different from the first discovery process, for the first computing device based on the definition to identify a first plurality of configuration items associated with a current configuration of the first computing device, and
         utilizes the service model database update module to update the service model database with at least some of the first plurality of configuration items, wherein the updated service model database is utilized in a subsequent discovery process to enhance a speed of the discovery process in the computer network.

2. An apparatus for discovering nodes in a computer network of a distributed computing system, comprising:
   a physical network interface that connects the apparatus to a computer network, and
   a processor configured to execute instructions stored in the memory, the instructions comprising:
      a discovery process module executed by the processor, comprising:
         an identification module that identifies a plurality of computing devices within the computer network by a signal input received at the physical network interface, the signals being related to the computing devices communicated over the computer network, and
         a configuration input module that inputs a respective configuration stored in a memory device, the configuration being associated with each of the plurality of computing devices,
      a discovery module that comprises:
         a configuration management search module,
         a discovery process modification module,
         a service model database update module,
      wherein the discovery module, upon discovery of a first computing device configured by an agent:
         utilizes the configuration management search module to search configuration management data of the computer network for a definition used by the agent to previously configure the first computing device,
         utilizes the discovery process modification module to modify a discovery process for the first computing device based on the definition to identify a first plurality of configuration items associated with a current configuration of the first computing device, and
         utilizes the service model database update module to update a service model database with the first plurality of configuration items, wherein the updated service model database is utilized in a subsequent discovery process to enhance a speed of the discovery process in the network, wherein the first plurality of configuration items includes a customer instance, a database server instance, an application server instance, or a web server instance, or any combination thereof.

3. The apparatus of claim 1, wherein the definition used by the agent comprises a previously discovered set of configuration items for the first computing device.

4. The apparatus of claim 1 wherein the discovery module is configured to discover the first computing device by finding one of:
an identifier stored with the first computing device that identifies the agent, or
an identifier stored within the service model database in association with a configuration item representing the first computing device.

5. The apparatus of claim 1 wherein the discovery process is configured to perform the second discovery process for the first computing device by searching only for a set of configuration items for the first computing device, the set of configuration items being identified by the definition.

6. The apparatus of claim 5 wherein one of the first plurality of configuration items is the same as the set of configuration items or the first plurality of configuration items is fewer than the set of configuration items.

7. The apparatus of claim 1 wherein the current configuration of the first computing device has at least one configuration item different from those comprising the first plurality of configuration items.

8. The apparatus of claim 1 wherein the configuration management data contains a plurality of agents used to configure a least some of the plurality of computing devices and the service model stores an output of the discovery process.

9. The apparatus of claim 1 wherein the processor is configured to:
periodically execute the discovery process for the first computing device and retain the existing discovery process.

10. A method for discovering nodes in a computer network of a distributed computing system, comprising:
executing, using a processor, a discovery process to identify a plurality of computing devices within a computer network and a respective configuration associated with at least some of the plurality of computing devices, the discovery process comprising:
inputting, at a physical network interface, signals obtained from the computer network related to the computing devices communicated over the computer network;
upon discovery of a first computing device not configured by an agent:
performing, using the processor, the discovery process for the first computing device to identify all configuration items associated with a current configuration of the first computing device; and
updating, using the processor, a service model database with identified configuration items;
upon discovery of a first computing device configured by an agent:
searching, using the processor, configuration management data of the computer network that is stored in a physical memory for a definition used by the agent to configure the first computing device;
performing, using the processor, the discovery process for the first computing device based on the definition to identify a first plurality of configuration items associated with a current configuration of the first computing device; and
updating, using the processor, the service model database with at least some of the first plurality of configuration items, wherein the updated service model database is utilized, using the processor, in a subsequent discovery process to enhance a speed of the discovery process in the computer network.

11. The method of claim 10 wherein the first computing device stores an identifier for the agent.

12. The method of claim 10, further comprising:
configuring the first computing device using the definition of the agent to assign a previously discovered set of configuration items to the first computing device.

13. The method of claim 12 wherein performing the discovery process for the first computing device comprises:
performing the discovery process by searching only for the previously discovered set of configuration items for the first computing device.

14. The method of claim 12 wherein the first plurality of configuration items is the same as the previously discovered set of configuration items.

15. The method of claim 12 wherein the first plurality of configuration items is fewer than the previously discovered set of configuration items.

16. The method of claim 12 wherein the current configuration of the first computing device has at least one configuration item different from those comprising the first plurality of configuration items.

17. The method of claim 10, further comprising:
comparing each identity of the plurality of computing devices to a plurality of identifiers within the service model database to discover the first computing device, each of the plurality of identifiers associated with at least one agent and at least one computing device.

18. The method of claim 10, wherein the discovery process further comprises receiving at a network interface an input signal communicated over the computer network that enables an identification of a plurality of computing devices within the computer network.

19. An apparatus for discovering nodes in a computer network of a distributed computing system, comprising:
a processor configured to execute instructions stored in a physical memory to:
execute a discovery process to identify a plurality of computing devices within a computer network and a respective configuration associated with at least some of the plurality of computing devices; and
upon discovery of a first computing device not configured by an agent:
perform the discovery process for the first computing device to identify configurations items associated with a current configuration of the first computing device; and
update a service model database with the identified configuration items;
upon discovery of a first computing device configured by an agent:
search configuration management data of the computer network that is stored in a memory for a definition used by the agent to configure the first computing device;
perform the discovery process for the first computing device based on the definition to identify a first plurality of configuration items associated with a current configuration of the first computing device; and update the service model database with at least some of the first plurality of configuration items.

20. The apparatus of claim 19, wherein the configuration comprises configuration data for at least some of the computing devices to facilitate operation of the platform.

* * * * *